Patented Jan. 27, 1925.

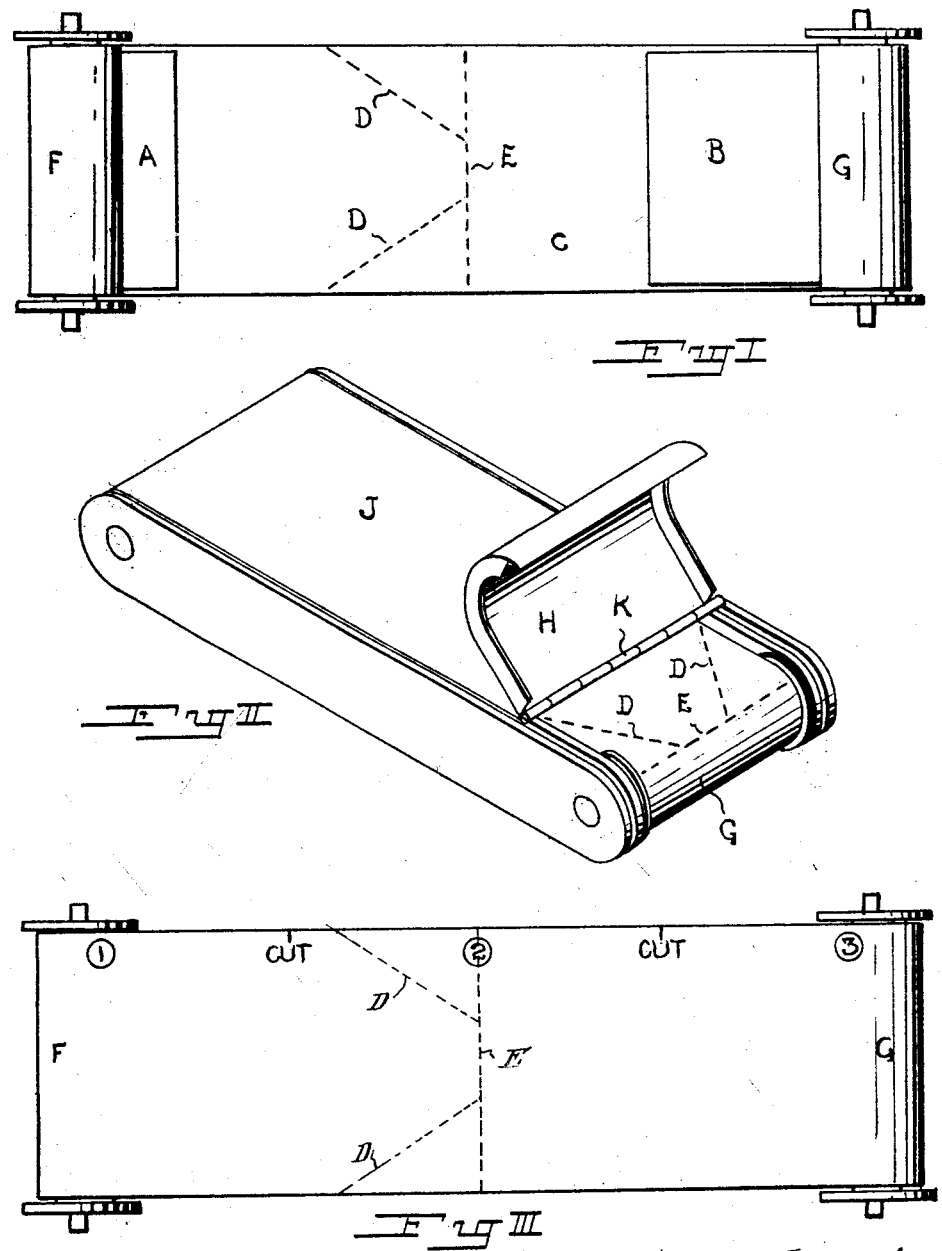

1,524,508

UNITED STATES PATENT OFFICE.

SOLOMON COHEN, OF BULAWAYO, RHODESIA.

FILM FOR PHOTOGRAPHIC PURPOSES.

Application filed November 16, 1922. Serial No. 601,330.

*To all whom it may concern:*

Be it known that I, SOLOMON COHEN, subject of the King of Great Britain, residing at Grand Hotel, Bulawayo, Rhodesia, have invented certain new and useful Improvements in and Relating to Films for Photographic Purposes, of which the following is a specification.

This invention relates to films for photographic purposes.

When the ordinary spool containing six or ten or any number of films is used, there is a great disadvantage in that it is necessary for economy that all the films should be exposed, before any can be developed, the result being that two or three films are exposed and then possibly weeks elapse before the remainder of the spool can be exposed and the whole developed.

According to this invention the films are mounted separately on the carrying paper and they are spaced apart at such a distance that each film can be rolled separately on a spool. One or more films can be removed from the camera as they are exposed, by severing the carrying paper and removing the spool on which the exposed film or films is or are rolled.

If the distance between successive films is sufficiently great, the invention can be applied to any film camera without modification of the camera back; but in order to allow the films to be placed closer together and thus to economize in space, it may be desirable to make the back of the camera, which is removable for the insertion of a roll of films, in such a way that one end can be raised so as to give access to the exposed spool without removing the whole of the back.

The invention is illustrated in the accompanying drawings in which

Fig. I shows a view of a spool of films constructed according to this invention.

Fig. II shows a camera fitted with a back, part of which is removable to give access to a film which is shown in the correct position for removal.

Fig. III shows the back of the paper carrier with the markings necessary.

Referring to Fig. I, A and B are two separate films mounted on carrying paper C. The paper is perforated at E along a transverse line which extends entirely across it, and at D along two lines which extend inwardly in converging relation from the longitudinal edges of the strip in rear of line E and which intersect the central portion of that line at points spaced from each other, thereby forming a blunt-ended, tapering or frusto-triangular tongue; this arrangement rendering the paper strong enough to resist the tension applied when the film is rolled from one spool to the other.

F represents the unexposed and G the exposed spool.

Supposing the film B has been exposed and is wound onto the spool G until the line E almost reaches said spool, it will be possible to sever the paper along the lines *d* and *e*, thus enabling the spool G to be withdrawn and a new spool substituted, the end of the paper D, E, D being so shaped that it can readily be inserted in the slit in the spool.

The distance between the films A and B which has been found to be suitable and which effectively prevents ingress of light into the rolled film is approximately six inches, for a film of postcard size, when the arrangement shown in Fig. II is in use. This figure shows a portion H of the back J hinged at K, so that it can be lifted to give access to the spool G without removing the whole back J. Suitable packing is inserted under the hinge K to prevent the ingress of light.

The carrying paper C is marked in the usual manner so as to show when a film is in the correct position for exposure, and it is also preferably marked as indicated for example in Fig. III so that the operator may know when the spool is in the correct position for withdrawing one or more films.

I claim:

1. A spool of film for photographic purposes, comprising a continuous opaque backing strip or carrier, and a plurality of sensitized portions of film mounted successively thereon in spaced relation; said strip being provided in the space between the adjacent ends of each two successive films with a transverse score-line extending entirely across the strip and with two separate score-lines extending inwardly in converging relation from the longitudinal edges of said strip in rear of the transverse score-line and intersecting the central portion of the latter line, whereby the strip may be severed along the score-lines after the exposure of a film to remove the exposed film and to provide a tapering tongue on the forward end of the strip for insertion in the slot in the winding spool; substantially as described.

2. A spool of film for photographic purposes, comprising a continuous opaque backing strip or carrier, and a plurality of sensitized portions of film, one individual to each exposure, mounted successively thereon in spaced relation; said strip being provided in the space between the adjacent ends of each two successive films with a transverse score-line extending entirely across the strip and with two separate score-lines extending inwardly in converging relation from the longitudinal edges of said strip in rear of the transverse score-line and intersecting the central portion of the latter line at points spaced from each other, whereby the strip may be severed along the score-lines after each exposure to remove the exposed film and to provide a frusto-triangular tongue on the forward end of the strip for insertion in the slot in the winding spool; substantially as described.

In testimony whereof I affix my signature in the presence of two witnesses.

SOLOMON COHEN.

Witnesses:
W. F. NEVIN.
ARTHUR C. A. HACKER.